(12) United States Patent
Kakino et al.

(10) Patent No.: US 6,384,560 B1
(45) Date of Patent: May 7, 2002

(54) ABNORMALITY DETECTION APPARATUS FOR TOOL AND NUMERICAL CONTROL APPARATUS PROVIDED WITH SAME

(75) Inventors: Yoshiaki Kakino, 256-5, Iwakura-hanazono-cho Sakyo-ku, Kyoto 606-0024 (JP); Makoto Fujishima, Yamatokoriyama (JP); Hisashi Otsubo, Okayama (JP); Hideo Nakagawa, Itami (JP); Yoshinori Yamaoka, Aichi (JP); Torao Takeshita, Tokyo (JP)

(73) Assignees: Yoshiaki Kakino, Kyoto; Mori Seiki Co., Ltd., Yamatokoriyama; Yasda Precision Tools K.K., Okayama; Osaka Kiko Co., Ltd., Osaka; Yamazaki Mazak Corporation, Aichi; Mitsubishi Denki Kabushiki Kaisha, Tokyo, all of (JP)

( * ) Notice: Subject to any disclaimer, the term of this patent is extended or adjusted under 35 U.S.C. 154(b) by 0 days.

(21) Appl. No.: 09/657,591

(22) Filed: Sep. 8, 2000

(30) Foreign Application Priority Data

Sep. 10, 1999 (JP) ............................................ 11-256873

(51) Int. Cl.$^7$ .............................................. G06F 15/46
(52) U.S. Cl. ........................ 318/566; 571/433; 571/434; 571/568.16; 571/568.24; 700/175; 408/6
(58) Field of Search ................................. 318/571, 433, 318/434, 561, 566, 568.16, 568.24, 569, 646; 700/160, 173, 175, 177, 190; 408/6, 9, 11

(56) References Cited

U.S. PATENT DOCUMENTS

| | | | | |
|---|---|---|---|---|
| 4,408,280 A | * | 10/1983 | Bedini et al. | 318/571 |
| 4,478,538 A | * | 10/1984 | Kakino | 408/6 |
| 4,698,773 A | * | 10/1987 | Jeffsson | 318/571 |
| 4,787,049 A | * | 11/1988 | Hirata et al. | 318/561 |
| 5,568,028 A | * | 10/1996 | Uchiyama et al. | 318/566 |

FOREIGN PATENT DOCUMENTS

| | | |
|---|---|---|
| JP | 55-120954 | 9/1980 |
| JP | 03-161241 | 7/1991 |
| JP | 05-116056 | 5/1993 |
| JP | 05-277898 | 10/1993 |
| JP | 07-024694 | 1/1995 |
| JP | 07-051996 | 2/1995 |
| JP | 08-054915 | 2/1996 |
| JP | 10-286743 | 10/1998 |
| JP | 11-058113 | 3/1999 |
| JP | 2000-107987 | 4/2000 |

* cited by examiner

*Primary Examiner*—Khanh Dang
(74) *Attorney, Agent, or Firm*—Armstrong, Westerman & Hattori, LLP.

(57) ABSTRACT

An abnormality detection apparatus for a tool (11) is described for judging abnormalities of a tool by a uniformly set threshold value in relation to a cutting load even in a machining process wherein a feed rate changes every moment. The abnormalities of the tool can be judged by the uniformly set threshold value on the basis of the tool load wherefrom the feed load that fluctuates upon the feed rate has been removed.

3 Claims, 6 Drawing Sheets

ABNORMALITY DETECTION APPARATUS FOR TOOL AND NUMERICAL CONTROL APPARATUS PROVIDED WITH SAME

BACKGROUND OF THE INVENTION

1. Field of the Invention

The present invention relates to an abnormality detection apparatus for a tool for detecting abnormal conditions represented by a condition which a wear and abrasion degree of the tool to be used for machining of a machine tool is over limit, and also relates to a numerical control apparatus provided with such abnormality detection apparatus for a tool.

2. Related Art Statement

Conventionally, as a time taken for machining has elapsed, a cutting resistance of a nose of a tool to be used for machining increases as a wear and abrasion thereof progresses, finally the tool is broken. As the wear and abrasion of the tool progresses, precision in machining is deteriorated, whereby a specified precision in machining necessary to a work piece cannot be kept any more.

On the other hand, an unattended machining and a prolonged automatic machining have been thought to be matters of course. Therefore, an apparatus for automatically detecting abnormal conditions such as a wear and abrasion limit of the tool and the like has been required, as a result a wear and abrasion of a tool monitoring apparatus disclosed in JP 11-58113 or the like has been developed.

Such wear and abrasion of a tool monitoring apparatus detects a torque load acting upon a spindle motor from a load current thereof, on the other hand, detecting a thrust load acting upon a feed shaft motor from a load current thereof, comparing the detected maximum torque load with a warning torque load set as a threshold value for displaying both of them on display means, while comparing the detected maximum thrust load with a warming thrust load set as a threshold value for displaying both of them on the display means, noticing an operator that a wear and abrasion of the tool comes to a limit thereof.

However, such wear and abrasion of a tool monitoring apparatus described above has following problems. Since the torque load detected from the load current of above-mentioned spindle motor and the thrust load detected from the load current of the feed shaft motor change on the basis of a feed rate of the feed shaft, the torque load and the thrust load are comparatively kept low even though the wear and abrasion of the tool comes to the limit thereof in machining at a low feed rate, while the torque load and the thrust load are comparatively kept high even though the wear and abrasion of the tool is at an early stage thereof in machining at a high feed rate, therefore the warning torque load and the warning thrust load cannot be set uniformly. Consequently, it has been necessary to set an appropriate warning torque load and an appropriate warning thrust load respectively for each feed rate in above-mentioned wear and abrasion of a tool monitoring apparatus.

Lately, as a spindle drive system and a feed drive system of a machine tool have been improved in speed and acceleration thereof, an operation of the feed drive system is controlled by an adaptive control with using such improved machine tool aiming at a safety and highly effective high-speed cutting. The adaptive control monitors a cutting load acting upon the spindle drive system and the feed drive system, gradually increasing the feed rate of the feed drive system to make the cutting load up to a preliminarily set value so that the spindle drive system and the feed drive system can display optimal functions thereof. A change of the cutting load (the thrust load) in a drilling process is shown in FIG. 6 when the feed rate of the feed drive system is gradually increased by the adaptive control. With the use of a coated carbide solid drill with an oil hole (MDW085MHK available from Sumitomo Denko Co., Ltd.) having a diameter of 8.5 mm, a work piece of FC250 was drilled at a cutting speed of 150 m/min for formation of holes each having a depth of 25.5 mm.

In FIG. 6, a first peak indicates the cutting load at a feed rate (feed per revolution) of 0.2 mm/rev, a second peak indicates same at 0.25 mm/rev, a third peak indicates same at 0.3 mm/rev, a fourth peak indicates same at 0.35 mm/rev, and a fifth peak indicates same at 0.4 mm/rev. In addition in FIG. 6, a line A indicates the cutting load set as a target value of the adaptive control, and a line B indicates a lower limit of the cutting load set to detect abnormalities represented by a break of a tool or the like.

As shown in FIG. 6, the cutting load is 1000N when the feed rate is set at 0.2 mm/rev while it is 1800N at 0.4 mm/rev, which shows that the cutting load increases quantity thereof almost by 1.8 times when the feed rate is doubled. Therefore, if the cutting load is set to 1500N in machining at the feed rate of 0.2 mm/rev with using a tool having already reached a tool life thereof (a tool life judged by a wearing condition), machining at the feed rate of 0.4 mm/rev with the cutting load of 1800N is thought to be impossible wherein the tool life is judged upon above-mentioned 1500N as a threshold value. In other words, machining by the adaptive control is impossible. On the contrary, if the cutting load is set to 2500N in machining at the feed rate of 0.4 mm/rev with using the tool having already reached the tool life thereof, machining may be performed over the tool life at the feed rate of 0.2 mm/rev wherein the tool life is judged upon above-mentioned 2500N as a threshold value, whereby the tool can be broken. Thus, it can be understood that the tool life cannot be judged by making use of a uniformly set threshold value under the adaptive control.

OBJECTS AND SUMMARY OF THE INVENTION

The present invention has as its principal object the provision of an abnormality detection apparatus for a tool which can judge abnormal conditions of the tool by using a uniformly set threshold value in relation to a cutting load for machining wherein a feed rate changes every moment especially for machining under an adaptive control, and also the provision of a numerical control apparatus provided with such abnormality detection apparatus for a tool.

The present invention according to a first embodiment for attaining above-mentioned object relates to an abnormality detection apparatus for a tool used for machining provided to be installed to a spindle of a machine tool, comprising cutting load detecting means to detect a cutting load on the basis of an electric current for driving that is output to a feed drive system and/or an electric current for driving that is output to a spindle drive system of the machine tool, feed load estimating means to estimate a feed load on the basis of a feed rate of the feed drive system wherein the feed load is a load component depending on the feed rate, tool load detecting means to pick out a load component depending on the tool by removing the feed load data estimated by the feed load estimating means from the cutting load data detected by the cutting load detecting means, and abnormality judging means to judge whether the tool is in an abnormal condition or not on the basis of the load data picked out by the tool load detecting means.

According to the present invention, a cutting load (a total cutting load) is detected on the basis of the electric current for driving that is output to the feed drive system and/or the electric current for driving that is output to the spindle drive system of the machine tool, on the other hand, the feed load as the load component which depends on the feed rate of the feed drive system is estimated. Then, the load component (a tool load) which depends on the tool is picked out by reducing the estimated feed load from the detected total cutting load. The tool load picked out is compared with a preliminarily set threshold value for judgement whether the tool is in the abnormal condition or not.

Thus, according to the present invention, since a tool life is judged upon the tool load picked out after the feed load or the load component depending on the feed rate of the feed drive system has been removed from the total cutting load and the load component depending on the tool has been completely picked out, the tool life can be correctly judged with using the uniformly set threshold value even in machining wherein the feed rate of the feed drive system changes every moment. Therefore, troublesome such that a setting of the threshold value for judgement must be changed whenever the feed rate changes as in a conventional apparatus can be removed.

Data as a basis of judgement of above-mentioned tool life is not limited by the tool load according to the first embodiment, but can be used for computing a wear and abrasion degree of the tool whereupon the tool life can be judged as in the invention according to a second embodiment. Here, the present invention according to the second embodiment comprises wear and abrasion degree computing means for computing the wear and abrasion degree of the tool on the basis of the load data picked out by the tool load detecting means in addition to the means of the first embodiment, wherein the abnormality judging means judge whether the tool is in the abnormal condition or not upon the wear and abrasion degree computed by the wear and abrasion degree computing means. Furthermore, the wear and abrasion degree of the tool can be indicated by making use of the ratio of a tool load of a new tool to that of a used tool having been used in machining for a specified time period. Although the tool load according to a first embodiment includes a component in relation to the feed rate, the wear and abrasion degree of the tool indicated by above-mentioned ratio of the tool load of the new tool to that of the used tool having been used in machining for a specified time period doesn't include such a component in relation to the feed rate, therefore the tool life can be securely judged.

The present invention according to the first and second embodiments can judge the abnormalities of the tool by making use of the uniformly set threshold value without being affected by the feed rate of the feed drive system, whereby great effects can be expected under the adaptive control wherein the feed rate of the feed drive system is changed according to the cutting load especially in the numerical control apparatus according to a third embodiment.

The present invention according to the third embodiment is the numerical control apparatus which numerically controls the feed drive system and the spindle drive system of the machine tool, provided with the abnormality detection apparatus for a tool according to the first and second embodiments, comprising adaptive controlling means for accelerating or decelerating the feed rate of the feed drive system on the basis of the cutting load detected by the cutting load detecting means.

Tools whose abnormalities can be detected according to the present invention include a tool installed to a spindle of a machining center provided to be used for machining, a rotary tool of a lathe for a complex machining and almost all tools used in the machine tool.

DETAILED DESCRIPTION OF THE PREFERRED EMBODIMENTS

Figure 1:
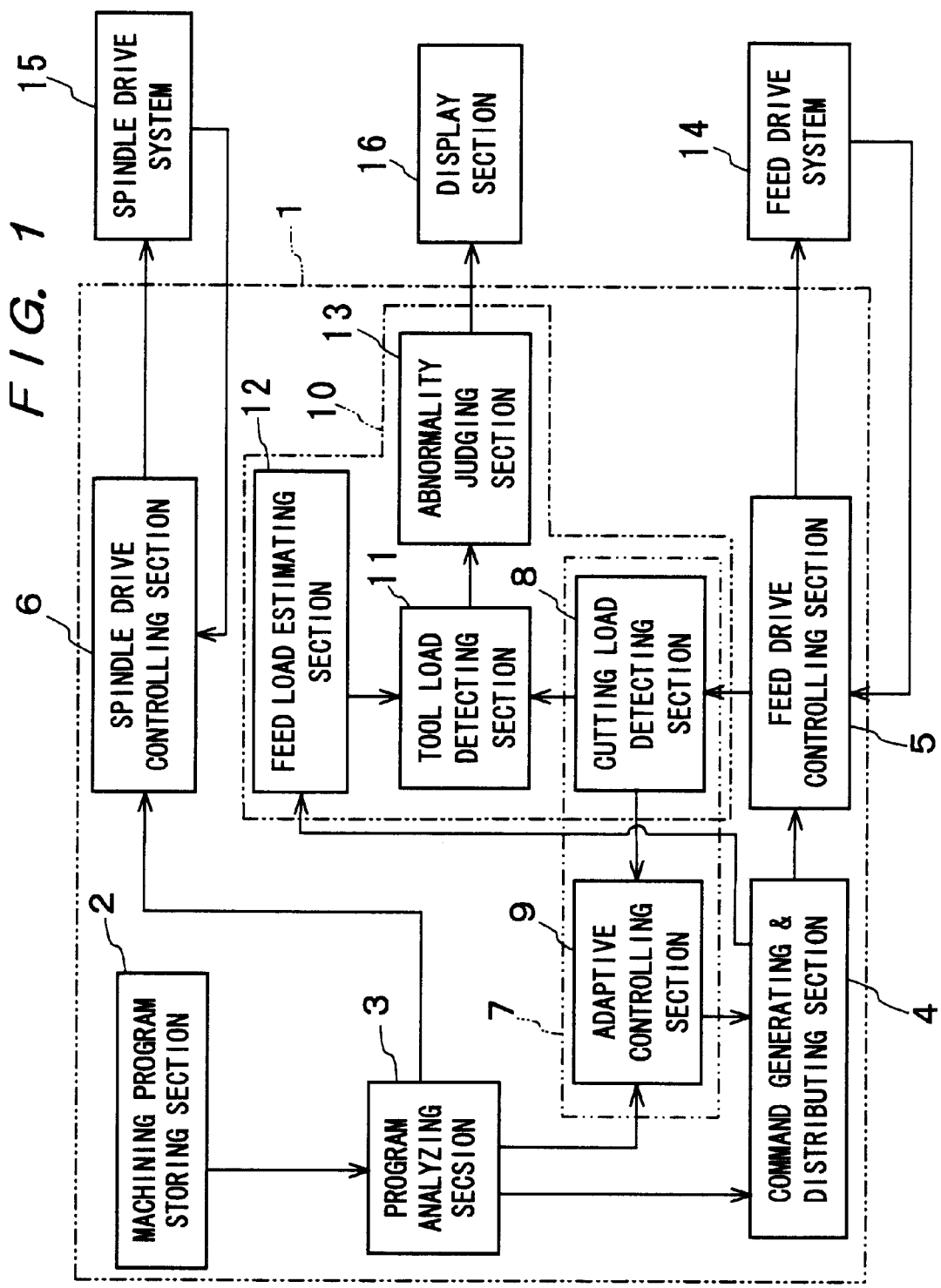
FIG. 1 is a block diagram showing an outline of a numerical control apparatus according to one embodiment of the present invention.

Embodiments of the present invention will be described below with reference to the accompanying drawings. FIG. 1 is a schematic block diagram showing an outline of the arrangement of a numerical control apparatus according to one embodiment of the present invention. This embodiment shows the numerical control apparatus which enables a detection of abnormalities of a tool during a drilling process.

As shown in FIG. 1, a numerical control apparatus 1 mainly comprises a machining program storing section 2, a program analyzing section 3, a command generating and distributing section 4, a feed drive controlling section 5, a spindle drive controlling section 6, adaptive controlling means 7, abnormality detection means for a tool 10 and the like, wherein the adaptive controlling means 7 comprise a cutting load detecting section 8 and an adaptive controlling section 9, while the abnormality detection means for a tool 10 comprise the cutting load detecting section 8 which owns the same construction of that of the adaptive controlling section 7, a feed load estimating section 12, a tool load detecting section 11, and an abnormality judging section 13. Each section will be described below in detail. In FIG. 1, reference 14 is a feed drive system of a machine tool, reference 15 is a spindle drive system, and reference 16 is display means such as a CRT.

The machining program storing section 2 is a functioning section to store a preliminarily created machining program. The program analyzing section 3 analyzes the machining program stored in the machining program storing section 2, picking out commands in relation to a rotation of the spindle, and an adaptive control, a feed rate, a feed position or the like of the feed drive system from the machining program, transmitting the command in relation to the rotation of the spindle to the spindle drive controlling section 6, transmitting the command in relation to the adaptive control of the feed drive system 14 to the adaptive controlling section 9, and transmitting the commands in relation to the feed rate and the feed position of the feed drive system 14 to the command generating and distributing section 4.

The spindle drive controlling section 6 outputs an electric current for driving generated upon the received command signals to the spindle drive system 15 for controlling an operation thereof. On the other hand, the command generating and distributing section 4 determines target feed positions at regularly spaced time points for the operation of the feed drive system 14 on the basis of the received command signals and a predetermined time constant to generate operation command signals indicative of the respective target feed positions, and then transmits the operation command signals one after another to the feed drive controlling section 5. The feed drive controlling section 5 generates a velocity command signal by multiplying a deviation of a present position signal fed back from the feed drive system 14 from a received operation command signal by a position loop gain. Then the feed drive controlling section 5 generates an electric current command signal by multiplying a deviation of a present velocity signal fed back from the feed drive system 14 from the generated velocity command signal by a velocity loop gain. The feed drive controlling section 5 further generates an electric current for driving according to a drive command signal obtained by multiplying a deviation of a present electric current for driving signal fed back from the feed drive system 14 from the generated electric current command signal by an electric current loop gain and outputs such electric current for driving to the feed drive system 14 for controlling the operation thereof. Although the single feed-drive system is shown in FIG. 1, machine tools such as machining centers generally have a plurality of feed drive systems 14, and the command generating and distributing section 4 and the feed drive controlling section 5 are provided for each of the plurality of feed drive systems 14.

The cutting load detecting section 8 is a process section to compute a cutting load (a thrust load or a total cutting load) from the electric current for driving that is output to the feed drive system 14 from the feed drive controlling section 5, more precisely to say, to compute the cutting load by multiplying the electric current for driving by a preliminarily set constant. The adaptive controlling section 9 starts a process of the adaptive control with receiving an adaptive control starting command from the program analyzing section 3, outputting a command to the command generating and distributing section 4 so as to increase the feed rate of the feed drive system 14 step by step such that the cutting load detected by the cutting load detecting section 8 reaches a preliminarily set target value, while receiving an adaptive control finishing command from the program analyzing section 3 to finish the process.

The feed load estimating section 12 is a process section to obtain information in relation to the feed rate of the feed drive system 14 from the command generating and distributing section 4 for estimating a feed load (a load depending on a feed of the feed drive system 14) occupying the total cutting load, computing such feed load from a relation between the feed rate and the feed load preliminarily obtained through an experimental method. More precisely to say, a work piece is processed by making use of a new tool with changing the feed rate so as to compute the relation between the feed rate and the feed load through a process as in above-mentioned cutting load detecting section 8. Thus, only a pure feed load without containing any load component depending on a wear and abrasion of the tool can be obtained with using such new tool.

Figure 2:
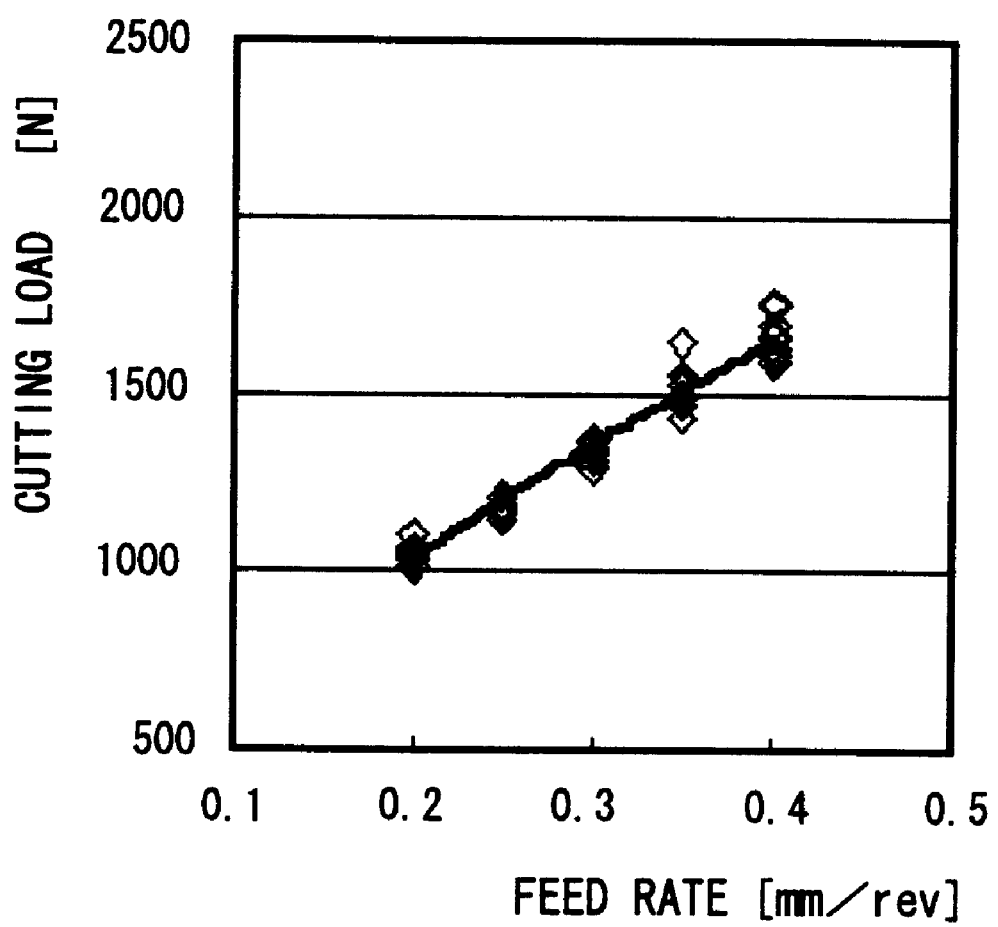
FIG. 2 is an explanation drawing showing process in a feed load estimating section according to the embodiment.

When a work piece of FC250 is drilled for formation of holes each having a depth of 25.5 mm with the use of a new article of coated carbide solid drill with an oil hole (MDW085MHK available from Sumitomo Denko Co., Ltd.) having a diameter of 8.5 mm, detected cutting loads are shown in FIG. 2, wherein a cutting speed is changed from 100 m/min, 125 m/min, 150 m/min, 175 m/min, to 200 m/min step by step, a feed rate is changed from 0.2 mm/rev, 0.25 mm/rev, 0.3 mm/rev, 0.35 mm/rev, to 0.4 mm/rev. Through a computing of the relation between the cutting load and the feed rate from the obtained data, a following formula can be established:

$$F_{new}=3101.2 \times f^{0.6861};$$

where $F_{new}$ is the cutting load (N) in machining with using a new tool, and f is the feed rate (mm/rev) of the feed drive system 14.

The feed load estimating section 12 computes the feed load with using the relation between the feed rate and the cutting load, also using the feed rate data obtained from the command generating and distributing section 4.

Figure 3:
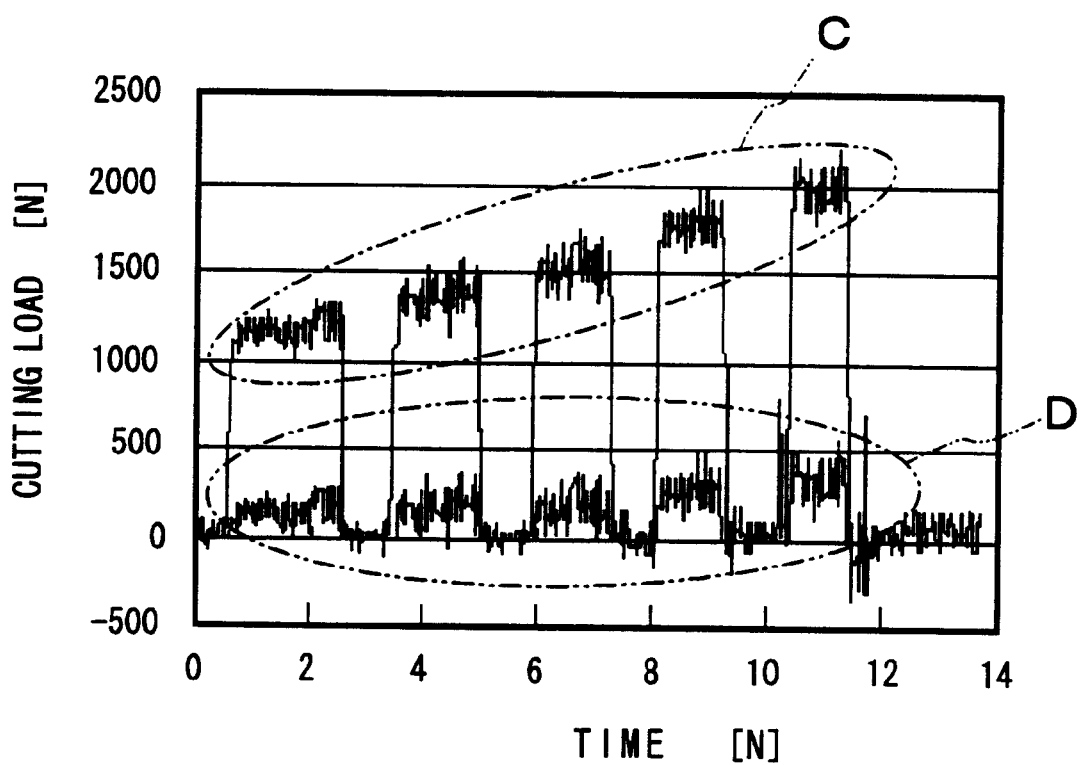
FIG. 3 is an explanation drawing showing process in a tool load detecting section according to the embodiment.

The tool load detecting section 11 is a process section to receive both of the total cutting load data detected by the cutting load detecting section 8 and the feed load data computed by the feed load estimating section 12, reducing the feed load from the total cutting load, computing the tool load as the load component which depends on the wear and abrasion of the tool. One embodiment of such computed tool load is shown in FIG. 3. In this FIG. 3, "C" is a group of data indicating the total cutting load that fluctuates upon the adaptive control, and "D" is a group of data indicating the tool load obtained by reducing the feed load (the feed load computed by above-mentioned formula) from the total cutting load.

Furthermore, data shown in FIG. 3 is obtained from the 2000th drilling of a hole having a depth of 25.5 mm in the work piece of FC250 with the use of the coated carbide solid drill with an oil hole (MDW085MHK available from Sumitomo Denko Co., Ltd.) having a diameter of 8.5 mm, wherein the cutting speed is set at 150 m/min. In above-mentioned "C" and "D", a first peak indicates a load at the feed rate of 0.2 mm/rev, a second peak indicates same at 0.25 mm/rev, a third peak indicates same at 0.3 mm/rev, a fourth peak indicates same at 0.35 mm/rev, and a fifth peak indicates same at 0.4 mm/rev.

As described in FIG. 3, by reducing the feed load that fluctuates according to the feed rate from the total cutting load, the tool load which never fluctuates according to the feed rate can be picked out.

Furthermore, the abnormality judging section 13 receives the tool load data detected by the tool load detecting section 11, comparing the received tool load data with a preliminarily set limit thereof, executing a process to judge that the tool is in the abnormal condition when the detected tool load data exceeds the limit thereof. Thereafter, when the tool is judged to be in the abnormal condition, the abnormality judging section 13 transmits information indicating the abnormality of the tool to the display means 16 so as to display an alarm indicating such abnormality, as a result warning an operator of the abnormality of the tool.

In this manner, according to the numerical control apparatus 1 in the embodiment as has been described above, the adaptive control for gradually increasing the feed rate of the feed drive system 14 upon the cutting load detected by the cutting load detecting section 8 is executed by the adaptive controlling section 9, on the other hand, the feed load according to the feed rate is computed by the feed load estimating section 12. Furthermore, the tool load detecting section 11 reduces the feed load computed by the feed load estimating section 12 from the total cutting load detected by the cutting load detecting section 8 so as to compute the tool load depending on the wear and abrasion of the tool. Thereafter, the abnormality judging section 13 compares the computed tool load with the preliminarily set limit thereof, judging that the tool is in the abnormal condition when the tool load exceeds the limit thereof.

Thus, according to the numerical control apparatus 1 in this embodiment, after reducing the feed load or the load component which depends on the feed rate of the feed drive system 14 from the total cutting load detected by the cutting load detecting section 8 and picking out the load component depending on the tool, the tool life is judged on the basis of such tool load picked out, whereby the tool life can be judged by making use of the uniformly set threshold value even in machining under the adaptive control wherein the feed rate of the feed drive system 14 changes every moment. Therefore, judgement can be done easily, as a result the trouble as in the conventional apparatus such that a setting of the threshold value for judgement must be changed whenever the feed rate changes can be completely removed.

Having described our invention as related to the embodiment, it is our intention that the invention be not limited by any of the details of description. For example, while in the embodiment described above, the cutting load (a cutting thrust) is detected on the basis of the electric current for driving that is output to the feed drive system from the feed drive controlling section 5, alternatively the cutting load (a cutting torque) may be detected on the basis of the electric current for driving that is output to the spindle drive system 15 from the spindle drive controlling section 6, furthermore, the cutting load may be evaluated from both of the cutting torque and the cutting thrust.

In addition, as in the embodiment, the tool life is judged on the basis of the tool load obtained by reducing the feed load from the total cutting load, however, a wear and abrasion degree of the tool can be computed from such tool load so as to judge the tool life on the basis of the computed wear and abrasion degree. An outline of the numerical control apparatus wherein the tool life is judged upon such wear and abrasion degree is shown in FIG. 4 as another embodiment.

Figure 4:
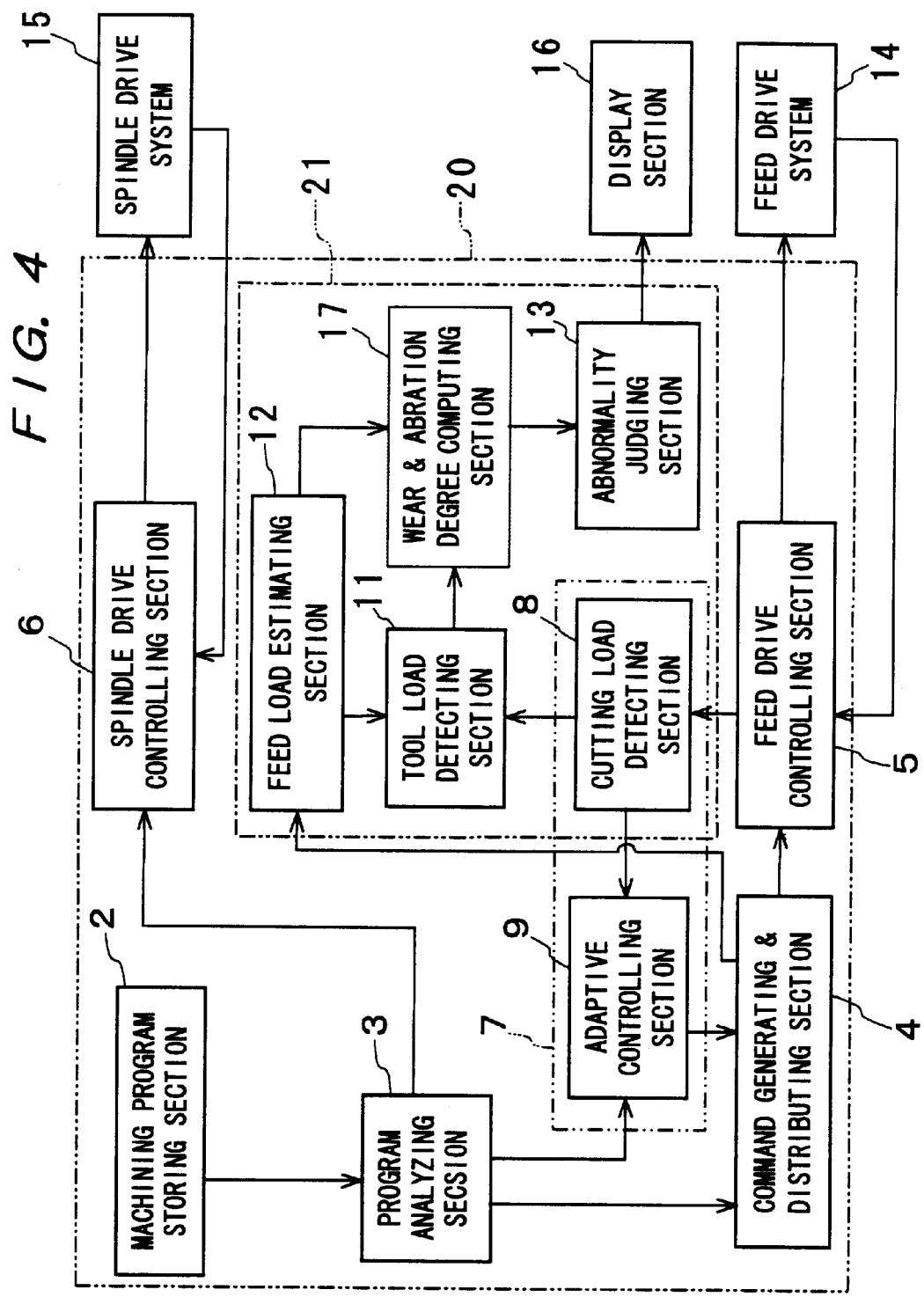
FIG. 4 is a block diagram showing an outline of a numerical control apparatus according to another embodiment of the present invention.

As shown in FIG. 4, a numerical control apparatus 20 comprises a wear and abrasion degree computing section 17 in addition to the means and the sections of the numerical control apparatus 1 shown in FIG. 1. Here, the same means or the section is shown by the same sign without a description in detail. In FIG. 4, reference 21 is an abnormality detection section for a tool provided with the wear and abrasion degree computing section 17.

Now, the total cutting load has been understood to be generally obtained by using a following formula:

$$F = Kf \times (1+Wf) \times f^{dff} \times D^{dfd};$$

where F is the total cutting load (N), Kf is a thrust constant decided by a combination of the work piece and the tool, Wf is the wear and abrasion degree of the tool, f (mm/rev) is the feed rate of the feed drive system 14 per one revolution of the spindle, D (mm) is a diameter of the drill, dff is an exponent of f, and dfd is an exponent of D.

If the tool is new, Wf is equal to zero, therefore, the total cutting load Fnew can be obtained by a following formula:

$$F_{new} = Kf \times f^{dff} \times D^{dfd};$$

where F can be obtained by a following formula:

$$F = (1+Wf) \times F_{new};$$

where $(F-F_{new})$ is the above-mentioned tool load, therefore if substituting Fi for $(F-F_{new})$, the wear and abrasion degree Wf can be obtained by a following formula:

$$Wf = Fi/F_{new}.$$

The wear and abrasion degree computing section 17 receives the tool load data Fi from the tool load detecting section 11, on the other hand, receiving a value of $F_{new}$ according to the feed rate from the feed load estimating section 12. Thus, by using the tool load Fi received from the tool load detecting section 11 and the value of $F_{new}$ received from the feed load estimating section 12, the wear and abrasion degree Wf can be obtained through above-mentioned formula: $Wf = Fi/F_{new}$. The abnormality judging section 13 receives data in relation to the wear and abrasion degree computed by the wear and abrasion degree computing section 17, comparing the obtained data with a preliminarily set threshold value, whereby judging that the tool is in the abnormal condition if the wear and abrasion degree exceeds such threshold value, as a result displaying the alarm indicating the abnormality of the tool on the display means 16.

Figure 5:
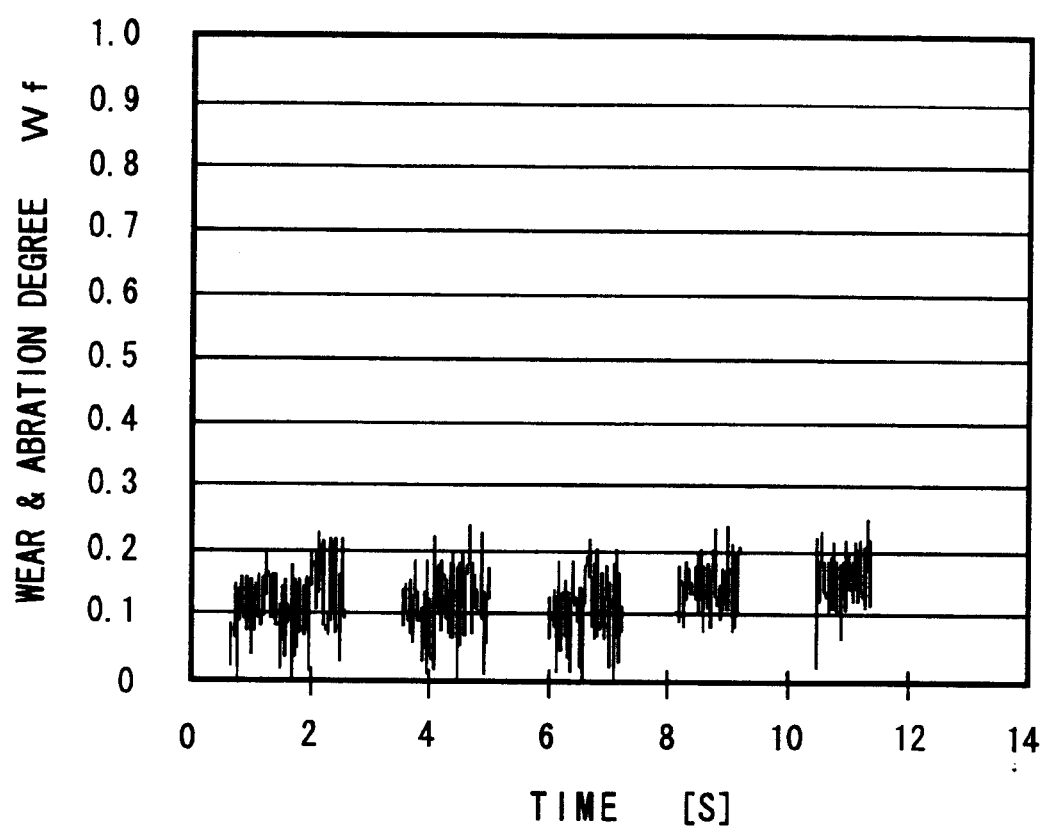
FIG. 5 is an explanation drawing showing process in a wear and abrasion degree computing section according to another embodiment of the present invention.
Figure 6:
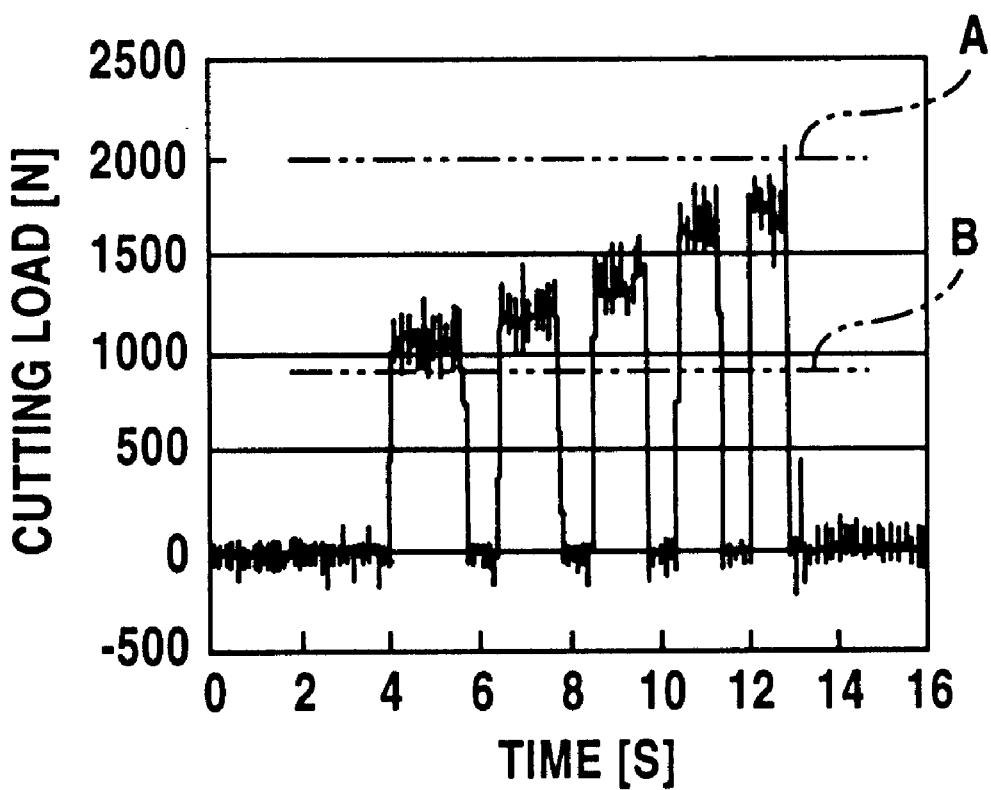
FIG. 6 is an explanation drawing showing a change of a cutting load during a drilling process under an adaptive control.

In addition, with using the tool load data shown in FIG. 3, the wear and abrasion degree computed through above-mentioned step is shown in FIG. 5. In FIG. 5, a first waveform from left indicates the wear and abrasion degree at the feed rate of 0.2 mm/rev, a second one indicates same at 0.25 mm/rev, a third one indicates same at 0.3 mm/rev, a fourth one indicates same at 0.35 mm/rev, and a fifth one indicates same at 0.4 mm/rev respectively. As having been understood from FIG. 5, when using such wear and abrasion degree, the tool life can be judged by the fixed threshold value with no affection of the feed rate.

Although above-mentioned tool load (Fi) includes a component ($f^{dff}$) in relation to the feed rate, such component in relation to the feed rate is not included in the wear and abrasion degree Wf in this embodiment, therefore, the tool life can be more precisely judged.

As many apparently widely different embodiments of this invention may be made without departing from the spirit and scope thereof, it is to be understood that the invention is not limited to the specific embodiments thereof except as defined in the appended claims. For example, abnormalities of the tool can be also detected by other embodiments in machining such as end milling, milling, lathe turning and the like.

What is claimed is:

1. An abnormality detection apparatus for a tool to detect abnormalities of a tool used for machining of a machine tool comprising:

cutting load detecting means to detect a cutting load on the basis of an electric current for driving that is output to a feed drive system of the machine tool and/or an electric current for driving that is output to a spindle drive system;

feed load estimating means to estimate a feed load on the basis of a feed rate of the feed drive system, wherein the feed load is a load component depending on the feed rate;

tool load detecting means to compute a tool load as a load component which depends on the tool by reducing the feed load estimated by the feed load estimating means from the cutting load detected by the cutting load detecting means; and abnormality judging means for a tool to judge whether the tool is in an abnormal condition or not on the basis of the tool load computed by the tool load detecting means.

2. An abnormality detection apparatus for a tool to detect abnormalities of a tool according to claim 1, comprising:

wear and abrasion degree computing means to compute the wear and abrasion degree of the tool on the basis of the load data picked out by the tool load detecting means, and wherein the abnormality judging means judge that the tool is in the abnormal condition on the basis of the wear and abrasion degree computed by the wear and abrasion degree computing means.

3. A numerical control apparatus to numerically control a feed drive system and a spindle drive system of a machine tool comprising an abnormality detection apparatus for a tool to detect abnormalities of a tool according to claim 1 or 2, comprising:

adaptive controlling means to accelerate or decelerate the feed rate of the feed drive system according to the cutting load detected by the cutting load detecting means.

\* \* \* \* \*